(12) United States Patent
Zheng et al.

(10) Patent No.: US 11,894,151 B2
(45) Date of Patent: Feb. 6, 2024

(54) INTEGRATED REACTOR SYSTEM HAVING PASSIVE REMOVAL OF RESIDUAL HEAT

(71) Applicant: SHANGHAI NUCLEAR ENGINEERING RESEARCH & DESIGN INSTITUTE CO., LTD., Xuhui District Shanghai (CN)

(72) Inventors: Mingguang Zheng, Shanghai (CN); Jinquan Yan, Shanghai (CN); Yu Chen, Shanghai (CN); Bo Yang, Shanghai (CN); Kemei Cao, Shanghai (CN); Zhan Liu, Shanghai (CN); Haitao Wang, Shanghai (CN)

(73) Assignee: SHANGHAI NUCLEAR ENGINEERING RESEARCH & DESIGN INSTITUTE CO., LTD., Shanghai (CN)

( * ) Notice: Subject to any disclaimer, the term of this patent is extended or adjusted under 35 U.S.C. 154(b) by 0 days.

(21) Appl. No.: 17/415,908

(22) PCT Filed: Aug. 20, 2020

(86) PCT No.: PCT/CN2020/110326
§ 371 (c)(1),
(2) Date: Jun. 18, 2021

(87) PCT Pub. No.: WO2021/109622
PCT Pub. Date: Jun. 10, 2021

(65) Prior Publication Data
US 2022/0351871 A1    Nov. 3, 2022

(30) Foreign Application Priority Data

Dec. 4, 2019   (CN) .......................... 201911227935.2

(51) Int. Cl.
*G21C 15/18* (2006.01)
*G21C 1/32* (2006.01)
(Continued)

(52) U.S. Cl.
CPC ............. *G21C 15/18* (2013.01); *G21C 1/322* (2013.01); *G21C 13/024* (2013.01); *G21C 1/09* (2013.01)

(58) Field of Classification Search
CPC ...... G21C 15/18; G21C 1/322; G21C 13/024; G21C 1/09
(Continued)

(56) References Cited

U.S. PATENT DOCUMENTS

2012/0294410 A1* 11/2012 Steinmoeller .......... G21C 13/02
376/399

FOREIGN PATENT DOCUMENTS

| CN | 85100182 A | 8/1986 |
| CN | 202855317 U | 4/2013 |

(Continued)

OTHER PUBLICATIONS

International Search Report and Written Opinion dated Nov. 23, 2020 for corresponding International Application No. PCT/CN2020/110326.
(Continued)

*Primary Examiner* — Jack W Keith
*Assistant Examiner* — Daniel Wasil
(74) *Attorney, Agent, or Firm* — Pearne & Gordon LLP

(57) ABSTRACT

An integrated passive reactor system including a pressure vessel, a containment vessel arranged outside the pressure vessel, and a reactor core arranged inside the pressure vessel. A primary loop operates in full natural circulation. The reactor system is provided with a secondary side passive residual heat removal system including a primary loop heat
(Continued)

exchanger arranged inside the pressure vessel and a passive residual heat removal heat exchanger arranged outside the containment vessel. The primary loop heat exchanger is arranged above the reactor core. The passive residual heat removal heat exchanger is arranged inside a water tank which is fixed outside the containment vessel. The primary loop heat exchanger and the passive residual heat removal heat exchanger are connected by heat exchanger inlet pipelines and heat exchanger outlet pipelines.

5 Claims, 1 Drawing Sheet

(51) Int. Cl.
  *G21C 13/024* (2006.01)
  *G21C 1/09* (2006.01)
(58) Field of Classification Search
  USPC .......................................... 376/298, 299, 307
  See application file for complete search history.

(56) References Cited

FOREIGN PATENT DOCUMENTS

| | | |
|---|---|---|
| CN | 103187108 A | 7/2013 |
| CN | 103295656 A | 9/2013 |
| CN | 104299663 A | 1/2015 |
| CN | 207909507 U | 9/2018 |
| CN | 110911020 A | 3/2020 |
| JP | 06-174890 A | 6/1994 |
| KR | 100856501 B1 * | 9/2008 ............. G21C 15/18 |

OTHER PUBLICATIONS

Chinese Office Action dated Aug. 30, 2021 for corresponding Chinese Application No. 201911227935.2 and English translations.
First Office Action dated Mar. 29, 2023 for corresponding Turkish Application No. 2021/013569 and English translations.

* cited by examiner

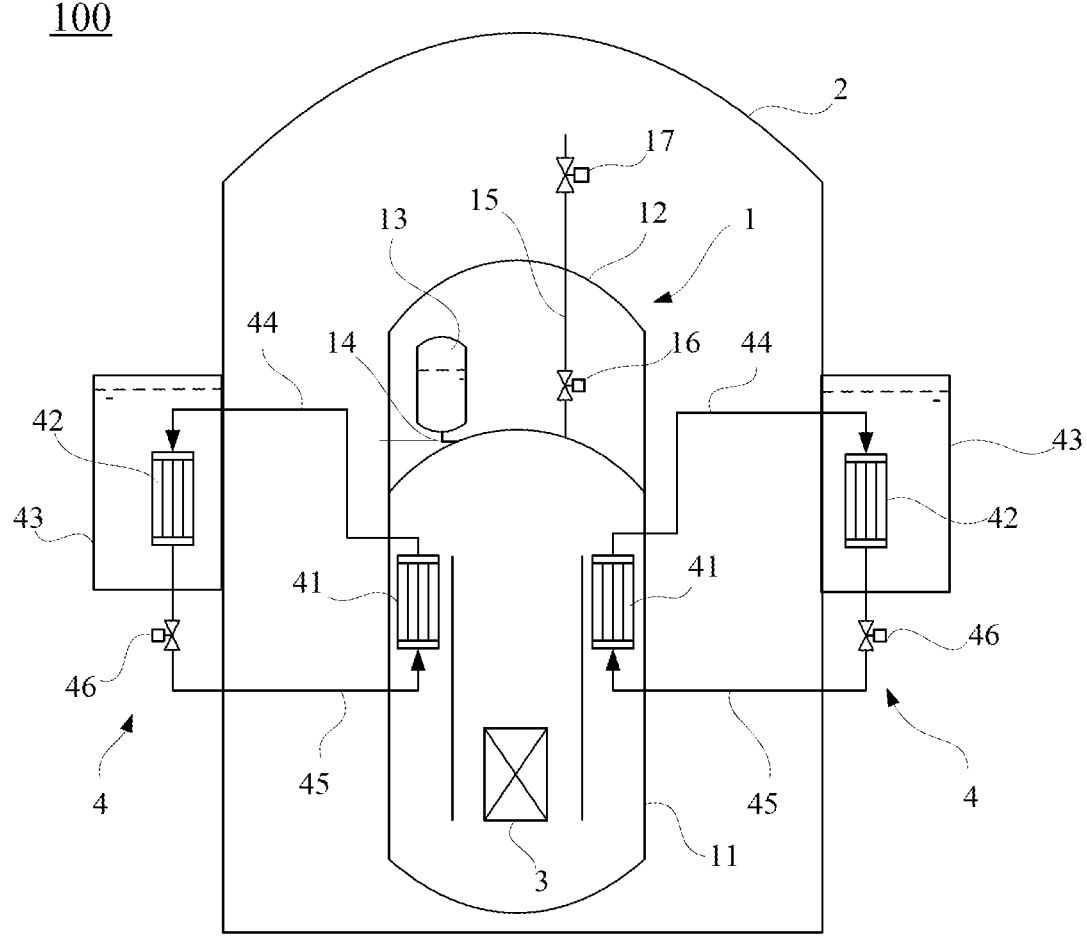

INTEGRATED REACTOR SYSTEM HAVING PASSIVE REMOVAL OF RESIDUAL HEAT

TECHNICAL FIELD

The present invention relates to the safety technical field of a nuclear power plant system.

BACKGROUND

In order to mitigate accidents, the reactors of the existing nuclear power plant generally are equipped with complex special safety facilities. The reactors currently in operation are mainly active type, and some three generation of reactors adopt passive manner, which usually have three independent series or four independent series, that is, for non-LOCA (loss of coolant accident), decay heat of the reactor core is removed by active auxiliary feed water system or passive residue heat removal system, and the heat is exported to the final heat sink (atmospheric environment) by active or passive cooling system for containment vessel in a limited time (such as 72 h, then manual intervention is required); for LOCA, a pressure relief system is usually used to reduce the pressure of the primary loop as soon as possible, and the reactor core is replenished with water through an (active or passive) safety injection system, and finally the heat is exported to the final heat sink (atmospheric environment) in a limited time through (active or passive) cooling system for containment vessel. There are several deficiencies in the manners for mitigating non-LOCA and LOCA. 1) There are too many series of active mitigation manners and the system is not simplified. 2) Maximum efficacy of the mitigation system could not be achieved. 3) Since a large amount of water needs to be replenished during LOCA, water replenishing equipment is needed and space of containment vessel should be increased. 4) Limiting accidents (such as large LOCA, rod ejection or locked rotor of primary pump) cannot be cancelled. 5) Active and passive mitigation manners for cooling are only effective in a limited time, while for a longer time, manual intervention (such as water supply and power supply, etc.) is required.

In addition, the existing pressure vessels of some small reactors adopt full double-layer shell design, which requires that the second-layer shell of the pressure vessel completely encompasses the first-layer shell of the pressure vessel, and the equipment or pipelines connected with the first-layer shell of the pressure vessel need to penetrate through the second-layer shell. On one hand, external vessel having a size of more than ten meters is needed. On the other hand, the connection and penetration between the two layers of the double-layer shell in vessels is complicated, which greatly increases the raw materials consumption and the difficulty and cost for manufacturing the equipment. In addition, once one certain penetrating member is damaged, it will greatly increase the maintenance difficulty.

SUMMARY OF THE INVENTION

In order to solve the above technical problem, the present invention provides an integrated passive reactor system. By adopting passive safety technology and a secondary side passive residual heat removal system, and with the help of top double-layer structure of the pressure vessel and break isolation measures, break accidents can be isolated, the risk of rod ejection accidents can be decreased or even eliminated, and the loss of coolant loading can be minimized, thus meeting the requirements for mitigating design basis accidents (LOCA, non-LOCA and rod ejection accidents) so as to ensure reactor safety and simplify system design. At the same time, the top double-layer design of the pressure vessel reduces the economic efficiency and maintenance complexity caused by the design of the full double-layer shell of the pressure vessel.

In order to achieve the above object, the present invention adopts the following technical solution:

An integrated passive reactor system comprises a pressure vessel, a containment vessel arranged outside the pressure vessel and a reactor core arranged inside the pressure vessel, wherein the reactor coolant pump(s) in the primary loop(s) are cancelled so as to simplify the design of the system and achieve operation in full natural circulation. The integrated passive reactor system is also provided with a secondary side passive residual heat removal system loop comprising primary loop heat exchanger(s) arranged inside the pressure vessel, passive residual heat removal heat exchanger(s) arranged outside the containment vessel, valves and pipelines, wherein the primary loop heat exchanger(s) is/are arranged above the reactor core, the passive residual heat removal heat exchanger(s) is/are arranged inside water tank(s) which is/are fixed outside the containment vessel, and the primary loop heat exchanger(s) and the passive residual heat removal heat exchanger(s) are connected by heat exchanger inlet pipelines and heat exchanger outlet pipelines.

Preferably, heat exchanger outlet isolation valve(s) is/are provided in the heat exchanger outlet pipelines outside the containment vessel.

Preferably, the pressure vessel comprises a first-layer shell and a second-layer shell arranged on the top of the first-layer shell, wherein a top double-layer structure is formed by the first-layer shell and the second-layer shell, pressurizer(s) is/are fixedly installed under the second-layer shell, surge pipe(s) is/are connected between pressurizer(s) and the first-layer shell, a plurality of primary loop-related pipelines are communicated with the second-layer shell, and the upper end of each primary loop-related pipeline penetrates through the second-layer shell and extends above it.

Preferably, primary loop pipeline isolation valve(s) inside the top double-layer shell is/are installed in each primary loop-related pipeline, which is/are arranged between the second-layer shell and the first-layer shell.

Preferably, primary loop pipeline isolation valve(s) outside the top double-layer shell is/are installed in each primary loop-related pipeline, which is/are arranged between the second-layer shell and the containment vessel.

Preferably, the integrated passive reactor system has at least two series of the secondary side passive residual heat removal system loops.

Compared with the prior art, the present invention has the following advantageous effects.

The passive safety technology of the present invention does not depend on external driving force (such as power supply, etc.), and design basis accidents are all mitigated by passive safety technology, thus greatly reducing the failure probability of the active system and improving the safety of the reactor.

According to the present invention, through full natural circulation, reactor coolant pump(s) is/are not needed in the primary loop. By adopting an operation mode of full natural circulation, the design for reactor system is simplified, the fault of the existing active reactor coolant pump(s) can be reduced, the operation and maintenance can be cancelled, and the safety of the reactor can be improved.

The pressure vessel according to the present invention adopts top double-layer shell design and the pressurizer and pipelines of the primary loop and the like are arranged inside the double-layer shell, thus the pressure boundary is maintained by effectively isolating the break, the challenge to the safety of the reactor caused by the small break is effectively mitigated, the safety of the reactor is guaranteed, the system design is greatly simplified, and meanwhile, the economic efficiency and the maintenance complexity brought by the design for the full double-layer shell of pressure vessel is reduced.

BRIEF DESCRIPTION TO THE DRAWING

FIG. 1 is a schematic structural diagram of an integrated reactor system according to an embodiment of the present invention.

MODE OF CARRYING OUT THE INVENTION

The technical solution in the embodiments of the present invention will be described clearly and completely with reference to the drawings of the present invention. Obviously, the described embodiments are only part of the embodiments of the present invention, not all of them. Based on embodiment of the present invention, all other embodiments obtained by a person skilled in the art on the premise of not paying creative labor, are in the scope of the protection of the present invention.

In the description of the present invention, it should be understood that the terms "upper", "lower", "front", "rear", "left", "right", "top", "bottom", "inside" and "outside" indicate the orientation or position relationship based on the drawings, and are only for convenience of describing the present invention and simplifying the description.

FIG. 1 is a schematic structural diagram of an integrated reactor system according to an embodiment of the present invention.

As shown in FIG. 1, the integrated reactor system 100 of this embodiment comprises a pressure vessel 1 and a containment vessel 2 arranged outside the pressure vessel 1, wherein a reactor core 3 and primary loop heat exchangers 41 are arranged inside the pressure vessel 1.

The integrated reactor system 100 is provided with a secondary side passive residual heat removal system loop 4 comprising primary loop heat exchangers 41 arranged inside the pressure vessel 1 and passive residual heat removal heat exchangers 42 arranged outside the containment vessel 2. The primary loop heat exchangers 41 are arranged above the reactor core 3, and the passive residual heat removal heat exchangers 42 are arranged inside water tanks 43 which are fixed outside the containment vessel 2. The primary loop heat exchangers 41 and the passive residual heat removal heat exchangers 42 are connected by heat exchanger inlet pipelines 44 and heat exchanger outlet pipelines 45. Heat exchanger outlet isolation valves 46 are provided in the heat exchanger outlet pipelines 45 outside the containment vessel 2.

The secondary side passive residual heat removal system loop 4 can be arranged in two or more series. For the sake of safety, at least two series of the above safety equipment should be considered, that is, the following situations should be considered: in case of a single failure or breakdown of a pipeline in one series, there is still one series that can effectively remove the heat from the reactor core.

In this embodiment, the integrated reactor system 100 is provided with two series of secondary passive residual heat removal system loops 4, and the primary loop heat exchangers 41 of the secondary passive residual heat removal system loops 4 are matched with the inlet and outlet pipelines of the corresponding series of passive residual heat removal heat exchangers 42. The outlet pipelines of the primary loop heat exchangers 41 are connected with inlet pipelines 44 of heat exchangers. After being cooled, the fluid flows into the primary loop heat exchangers 41 again through the outlet pipelines 45 of the heat exchangers, thus forming a natural circulation loops. The passive residual heat removal heat exchangers 42 are placed in the water tanks 43 which are arranged on the outer wall of the containment vessel 2. The integrated reactor system 100 uses natural circulation to bring out the decay heat released from the reactor core under design basis accidents including LOCA and non-LOCA, thus improving the environmental conditions in the containment vessel 2 and the reliability of the equipment.

After LOCA or non-LOCA occurs, the heat in the pressure vessel 1 is transferred to the water tanks 43 outside the containment vessel through the secondary passive residual heat removal system loops 4, so as to reduce the temperature and pressure in the pressure vessel 1. In the short-term stage, the capacity of the water tanks 43 ensure that the reactor core 3 will be brought to a safe and stable state; in the long-term cooling stage, the water in the water tanks 43 outside the containment vessel will gradually boil and evaporate; after that, the passive residual heat removal heat exchangers 42 will continue to take out the heat from the reactor core 3 through air cooling, thus achieving the object of limitless cooling in the long-term stage without manual intervention.

In traditional nuclear power plants, there are several reactor coolant pumps in the primary loop and the secondary loop (usually one main pump is arranged in each loop) to drive the fluid flow. In this embodiment, the loop inside the pressure vessel 1 and secondary passive residual heat removal system loops 4 are of natural circulation design, and there is no need for the reactor coolant pump in the primary loop and pumps in the secondary passive residual heat removal system loops. The heat transfer in full natural circulation is realized through density difference, thus realizing operation in full natural circulation mode, simplifying the design of the system to the greatest extent, reducing the cost and canceling the pump failure and operation and maintenance.

In this embodiment, the pressure vessel 1 has top double-layer structure including a first-layer shell 11 and a second-layer shell 12 arranged on the top of the first-layer shell so as to form top double-layer structure with the first-layer shell 11. Pressurizer 13 is fixedly installed under the second-layer shell 12, pressurizer surge pipe 14 is connected between the pressurizer 13 and the first-layer shell 11, a plurality of primary loop-related pipelines 15 are communicated with the second-layer shell 12, and the upper end of each of the primary loop-related pipelines 15 penetrates through the second-layer shell 12 and extends above it.

The first primary loop pipelines isolation valve 16 inside the top double-layer shell is installed in each of the primary loop-related pipelines 15, and arranged between the second-layer shell 12 and the first-layer shell 11.

A second primary loop pipeline isolation valve 17 outside the double-layer shell is installed in each of the primary loop-related pipeline(s) 15, and arranged between the second-layer shell 12 and the containment vessel 2.

The pressurizer 13, the pressurizer surge line 14, and the first primary loop pipelines isolation valve 16 inside the top double-layer shell are arranged between the second-layer shell 12 and the first-layer shell 11, and the primary loop-related pipelines 15 pass through the second-layer shell 12 and the first-layer shell 11, thus break can be effectively isolate and the primary loop water supply under LOCA can be reduced or even cancelled. In addition, by effectively using the top double-layer shell, the primary loop in the pressure vessel 1 is cooled and depressurized to the maximum extent through the secondary side passive residual heat removal system loop 4, so as to effectively mitigating the consequence of LOCA, thus eliminating the equipment which adopt low-pressure injection or pressure-accumulating injection cooling in typical reactor.

At the same time, by increasing the pressure inside the double-layer shell, the risk of rod ejection accident can be reduced, and even cancelled, thus effectively mitigating the impact of limiting accidents of rod ejection on the reactor core 3 and ensuring the safety of the reactor system.

In this embodiment, when break of primary loop-related pipelines 15 between the containment vessel 2 and the second-layer shell 12 of the pressure vessel is detected, the first primary loop pipelines isolation valve 16 inside the top double-layer shell is closed, so that the reactor coolant is still encompassed by the first-layer shell 11, and the reactor core 3 can still be effectively cooled. After the accident, the heat released from the reactor core 3 will be brought into the water tanks 43 outside the containment vessel through the secondary side passive residual heat removal system loop 4, so as to realize cooling and depressurization of the primary loop. In the short-term stage, the water stored in the water tanks 43 outside the containment vessel 2 can ensure that the reactor core 3 will be brought to a safe and stable state; in the long-term cooling stage, the water in the water tanks 43 outside the containment vessel will gradually boil and evaporate; after that, the passive residual heat removal heat exchangers 42 will continue to take out the heat from the reactor core 3 through air cooling, thus achieving the object of limitless cooling in the long-term stage without manual intervention.

When break of the primary loop-related pipeline 15 between the first-layer shell 11 of the pressure vessel and the second-layer shell 12 at top of the pressure vessel is detected, the second primary loop pipeline isolation valve 17 outside the double-layer shell is quickly closed, and the coolant is encompassed by the second-layer shell 12, which can still effectively cool the reactor core 3. After the accident, the heat released from the reactor core 3 will be brought into the water tanks 43 outside the containment vessel through the secondary passive residual heat removal system loop 4 to realize cooling and depressurization of the primary loop. In the short-term stage, the water stored in the water tanks 43 outside the containment vessel can ensure that the reactor core 3 will be brought to a safe and stable state; in the long-term cooling stage, the water in the water tanks 43 outside the containment vessel will gradually boil and evaporate; after that, the passive residual heat removal heat exchangers 42 will continue to take out the heat from the reactor core 3 through air cooling, thus achieving the object of limitless cooling in the long-term stage without manual intervention.

When the pressurizer surge line 14 breaks, the sprayed coolant is still encompassed by the second-layer shell 12 of the pressure vessel, which still plays a role in cooling the reactor core 3. Under this working condition, the reactor pressure boundary is not damaged (which is a non-LOCA among design basis accidents). The accident process is similar to the break accident of the primary loop-related pipeline 15 between the first-layer shell 11 of the pressure vessel 1 and the second-layer shell 12 at top of the pressure vessel 1, and the accident mitigation manner is the same.

For other non-LOCA among design basis accidents, (any layer of reactor pressure boundary is not damaged, such as loss of normal water supply accident), the mitigation manner is similar to that of LOCA accidents. After the accident, the heat released from the reactor core 3 will be brought into the water tanks 43 outside the containment vessel 2 through the secondary side passive residual heat removal system loop 4, so as to realize the cooling and depressurization of pressure vessel 1. In the short-term stage, the water stored in the water tanks 43 outside the containment vessel can ensure that the reactor core 3 will be brought to a safe and stable state; in the long-term cooling stage, the water stored in the water tanks 43 outside the containment vessel will gradually boil and evaporate; after that, the passive residual heat removal heat exchangers 42 will continue to take out the heat from the reactor core 3 through air cooling, thus achieving the object of limitless cooling in the long-term stage without manual intervention.

It should be noted that, in this context, relational terms such as first and second are used merely to distinguish one entity or operation from another entity or operation, and do not necessarily require or imply these entities or operations. There is any such actual relationship or order between them. Furthermore, the terms "including", "comprising" or "containing" are intended to include a non-exclusive inclusion, such that a process, method, article, or device that includes a plurality of elements includes not only those elements but also other elements that are not explicitly listed, or elements that are inherent to such a process, method, item, or device.

The above are only preferred embodiments of the present invention, but the scope of the present invention is not limited thereto. Based on the technical solution and inventive concept of the present invention within the scope disclosed by the present invention, any equivalent substitution or change made by those familiar with the technical field should fall within the scope of the present invention.

The invention claimed is:

1. An integrated passive reactor system comprising a pressure vessel, a containment vessel arranged outside the pressure vessel and a reactor core arranged inside the pressure vessel, wherein
    the integrated reactor system includes a secondary side passive residual heat removal system loop,
    the secondary side passive residual heat removal system loop comprises
        a primary loop heat exchanger arranged inside the pressure vessel
        and a passive residual heat removal heat exchanger arranged outside the containment vessel,
        the primary loop heat exchanger is arranged above the reactor core, and
        the passive residual heat removal heat exchanger is arranged in a water tank which is fixed outside the containment vessel,
    the primary loop heat exchanger and the passive residual heat removal heat exchanger are connected by a heat exchanger inlet pipeline and a heat exchanger outlet pipeline,
    the pressure vessel comprises a first-layer shell and a second-layer shell arranged on the top of the first-layer shell to form a top double-layer structure with the first-layer shell,
        wherein the first-layer shell encloses a first space and the second-layer shell encloses a second space fluidly isolated from the first space,
    a pressurizer is fixedly installed within the second-layer shell, and a surge pipe is provided between the pressurizer and the first-layer shell, a plurality of primary loop-related pipelines are communicated with the second-layer shell, and the upper end of each of the plurality of primary loop-related pipelines penetrates through the second-layer shell and extends above the second-layer shell.

2. The integrated passive reactor system according to claim 1, wherein a heat exchanger outlet isolation valve is arranged in the heat exchanger outlet pipeline outside the containment vessel.

3. The integrated passive reactor system according to claim 1, wherein each of the plurality of primary loop-related pipelines is provided with a first primary loop pipeline isolation valve arranged within the second-layer shell.

4. The integrated passive reactor system according to claim 1, wherein each of the plurality of primary loop-related pipelines is provided with a second primary loop pipeline isolation valve arranged between the second-layer shell and the containment vessel.

5. The integrated passive reactor system according to claim 1, wherein the integrated passive reactor system has at least two series of the secondary side passive residual heat removal system loop.

* * * * *